US010260901B2

(12) United States Patent
Geiger

(10) Patent No.: US 10,260,901 B2
(45) Date of Patent: Apr. 16, 2019

(54) METHOD FOR OPTIMIZING THE SWITCH-ON TIME OF A CORIOLIS GYROSCOPE AND CORIOLIS GYROSCOPE SUITABLE THEREOF

(71) Applicant: NORTHROP GRUMMAN LITEF GMBH, Freiburg (DE)

(72) Inventor: Wolfram Geiger, Ebringen (DE)

(73) Assignee: NORTHROP GRUMMAN LITEF GmbH (DE)

( * ) Notice: Subject to any disclaimer, the term of this patent is extended or adjusted under 35 U.S.C. 154(b) by 102 days.

(21) Appl. No.: 15/126,079

(22) PCT Filed: Jan. 27, 2015

(86) PCT No.: PCT/EP2015/000151
§ 371 (c)(1),
(2) Date: Sep. 14, 2016

(87) PCT Pub. No.: WO2015/135614
PCT Pub. Date: Sep. 17, 2015

(65) Prior Publication Data
US 2017/0097245 A1 Apr. 6, 2017

(30) Foreign Application Priority Data
Mar. 14, 2014 (DE) .................. 10 2014 003 640

(51) Int. Cl.
*G01C 19/00* (2013.01)
*G01C 25/00* (2006.01)
*G01C 19/5726* (2012.01)

(52) U.S. Cl.
CPC ....... *G01C 25/005* (2013.01); *G01C 19/5726* (2013.01)

(58) Field of Classification Search
USPC ......................................................... 73/1.38
See application file for complete search history.

(56) References Cited

U.S. PATENT DOCUMENTS 8,618,890 B2 12/2013 Yanagisawa et al.
9,052,196 B2 * 6/2015 Geiger ............... G01C 19/5755
(Continued)

FOREIGN PATENT DOCUMENTS

DE       601 19 642 T2    10/2006
DE    102005034702 A1    1/2007
(Continued)

OTHER PUBLICATIONS

Canadian Search Report for Application No. 294076 dated Jun. 12, 2017.
(Continued)

*Primary Examiner* — Clayton E. LaBalle
*Assistant Examiner* — Warren K Fenwick
(74) *Attorney, Agent, or Firm* — Tarolli, Sundheim, Covell & Tummino LLP

(57) ABSTRACT

A method for optimizing the switch-on time of a Coriolis gyroscope (1) having a mass system (100) which can be excited to an excitation oscillation of the Coriolis gyroscope (1) parallel to a first axis (x), wherein a deflection of the mass system on account of a Coriolis force along a second axis (y) which is provided perpendicular to the first axis (x) can be verified using an output signal from the Coriolis gyroscope, comprises determining the amplitude (A) of the excitation oscillation of the Coriolis gyroscope at a defined time, determining the output signal (S) from the Coriolis gyroscope at the defined time, and generating a normalized output signal ($S_0$) from the Coriolis gyroscope by multiplying the determined output signal (S) by the quotient of the amplitude ($A_0$) of the excitation oscillation of the Coriolis gyroscope in the steady state and the determined amplitude (A).

9 Claims, 5 Drawing Sheets

(56) References Cited

U.S. PATENT DOCUMENTS

| | | | | |
|---|---|---|---|---|
| 2010/0186503 A1* | 7/2010 | Spahlinger | | G01C 19/56 73/504.12 |
| 2011/0179868 A1 | 7/2011 | Kaino et al. | | |
| 2011/0314911 A1 | 12/2011 | Kim | | |
| 2015/0260545 A1* | 9/2015 | Yang | | G01C 25/005 73/1.77 |
| 2017/0097245 A1 | 4/2017 | Geiger | | |

FOREIGN PATENT DOCUMENTS

| | | |
|---|---|---|
| DE | 10 2005 034702 A1 | 2/2007 |
| DE | 601 33 162 T2 | 3/2009 |
| EP | 2 060 871 A2 | 5/2009 |
| EP | 2060871 A2 | 5/2009 |
| EP | 2 336 717 A1 | 6/2011 |
| EP | 2533011 A2 | 12/2012 |
| EP | 3117182 A1 | 1/2017 |
| JP | 2008-104261 A | 5/2008 |
| JP | 2008-139287 A | 6/2008 |
| JP | 4166244 B2 | 8/2008 |
| JP | 2008-209182 A | 9/2008 |
| JP | 4166256 B2 | 10/2008 |
| JP | 4620055 B2 | 1/2011 |
| JP | 2012-044844 A | 3/2012 |
| JP | 2013-003141 A | 1/2013 |
| JP | 2014503064 A | 12/2014 |
| RU | 2269747 C1 | 2/2006 |
| RU | 2383863 C1 | 3/2010 |
| WO | 2013/079139 A2 | 6/2013 |
| WO | 2013/143126 A1 | 10/2013 |

OTHER PUBLICATIONS

Notification of Reasons for Refusal for Application No. JP 2016-574336 dated Sep. 12, 2017.
Decision to Grant for corresponding KR patent application No. 10-2016-7025215, dated Nov. 24, 2017.
Decision to Grant a Patent for an Invention for corresponding Russian Application No. 2016134231/28, dated Dec. 1, 2017.
Korean Office Action for Application No. 10-2016-7025215 dated May 26, 2017.
International Preliminary Report on Patentability for Application No. PCT/EP2015/000151 dated Sep. 14, 2016.
International Search Report for Application No. PCT/EP2015/000151 dated Apr. 23, 2015.
European Office Action corresponding to European Patent Application No. 15701295.6, dated Aug. 12, 2018.

* cited by examiner

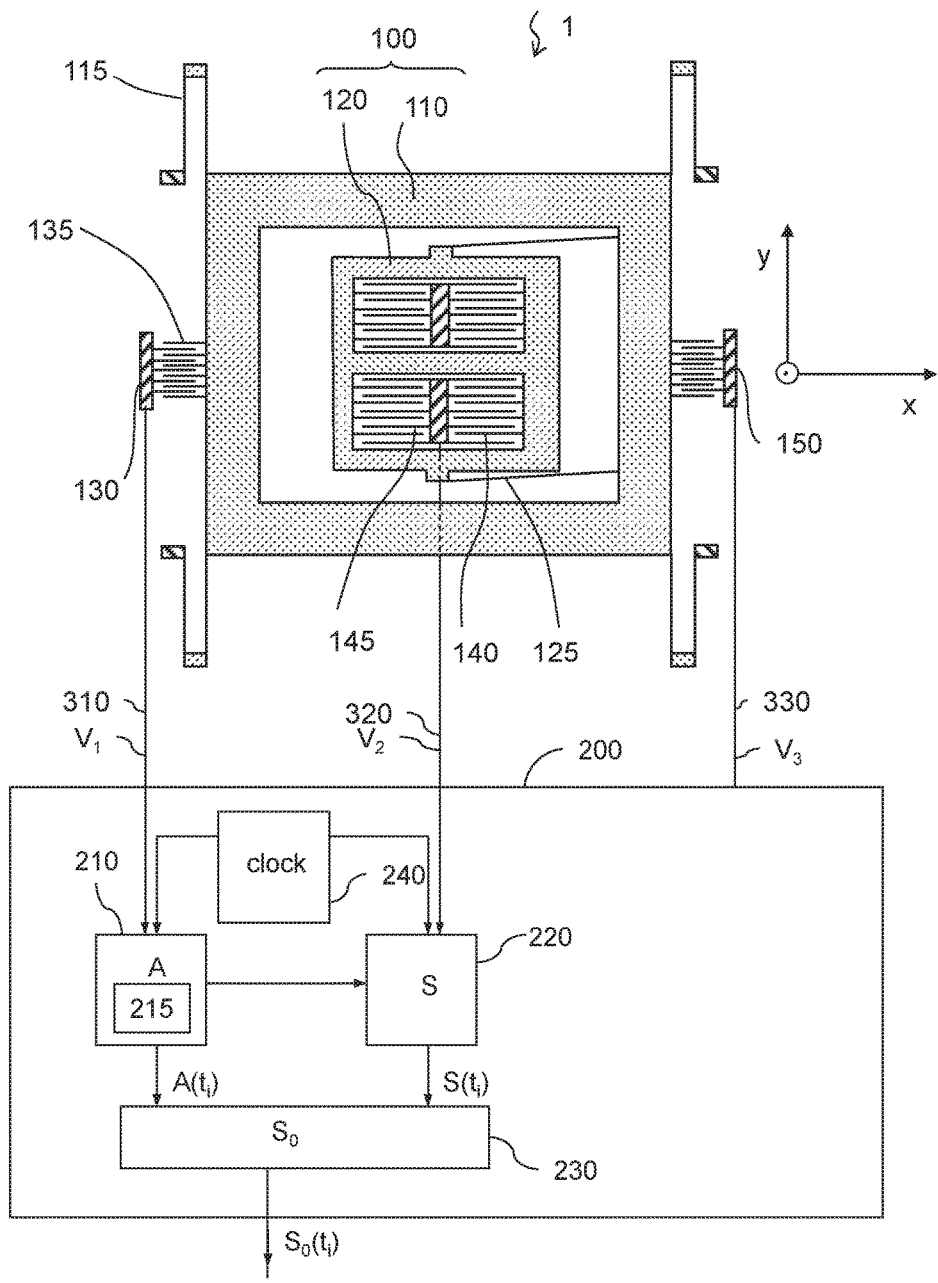

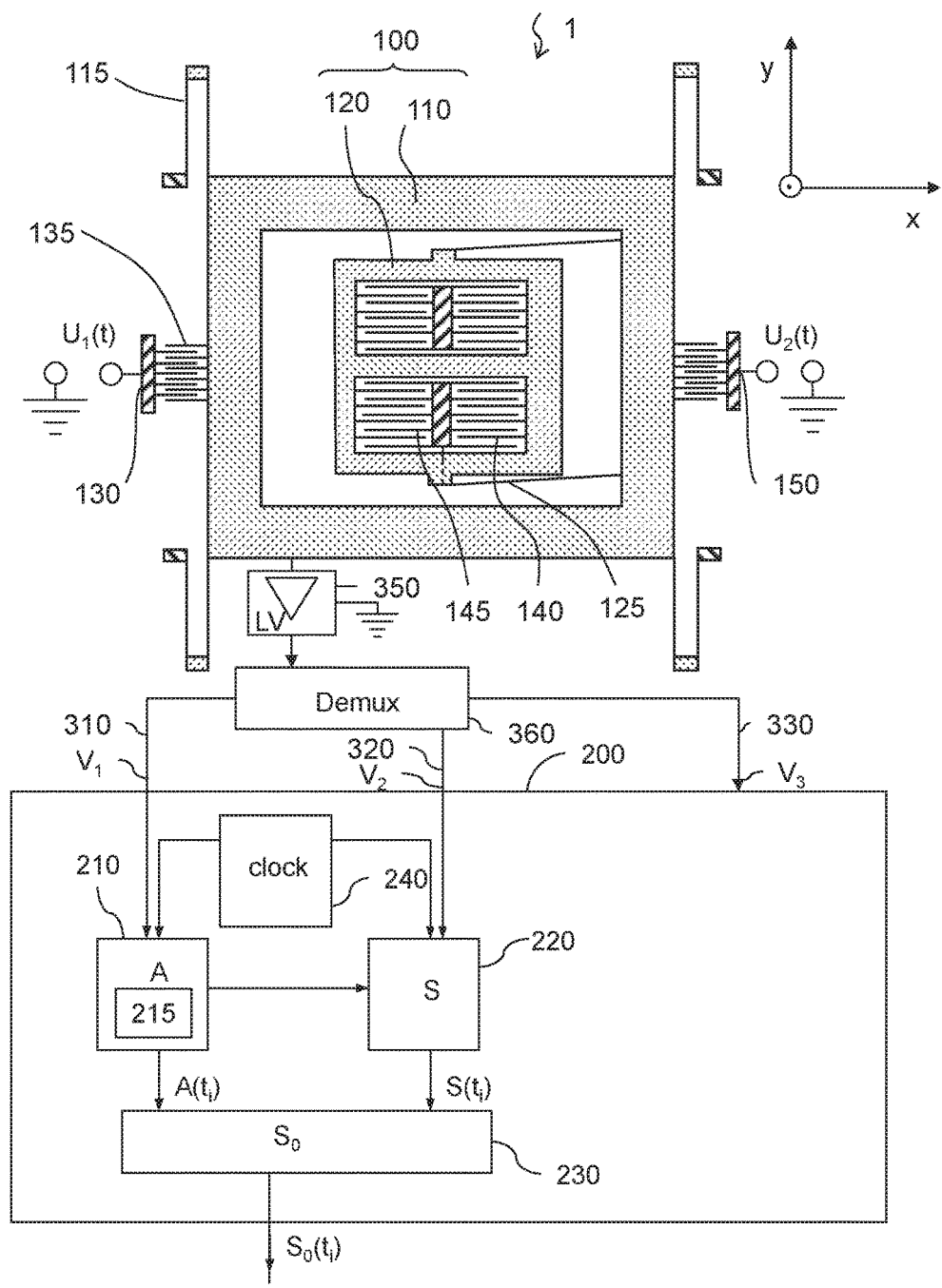

METHOD FOR OPTIMIZING THE SWITCH-ON TIME OF A CORIOLIS GYROSCOPE AND CORIOLIS GYROSCOPE SUITABLE THEREOF

RELATED APPLICATIONS

The present invention is a U.S. National Stage under 35 USC 371 patent application, claiming priority to Serial No. PCT/EP2015/000151, filed on 27 Jan. 2015; which claims priority from DE 10 2014 003 640.5, filed 14 Mar. 2014, the entirety of both of which are incorporated herein by reference.

The invention concerns a method for optimizing the switch-on time of a Coriolis gyroscope and a Coriolis gyroscope suitable therefor.

Coriolis gyroscopes (vibration gyroscope, rotation rate sensors) comprise a mass system that is one-piece or typically multipart and is brought into oscillations. To this end, a first oscillation mode (excitation oscillation) of the mass system is excited for operating the Coriolis gyroscope. If a rotational movement of the Coriolis gyroscope along its sensitive axes is carried out, the occurring Coriolis forces will excite a second oscillation mode of the mass system, which is either directly or indirectly measured, during which process an output signal is obtained that represents the second oscillation mode (read-out oscillation or detection oscillation). The read-out signal is evaluated with respect to changes of the amplitude that represent a measure for the rotation rate applied to the Coriolis gyroscope. In a Coriolis gyroscope according to a closed loop system the amplitude of the read-out oscillation is continuously re-set to a fixed value, e.g. zero, by means of a control loop such that the applied rotation rate is deduced from the restoration forces necessary in this process. The read-out signal of closed loop operation is then proportional to the Coriolis force $F_C$, while in the open loop operation the read-out signal is proportional to the amplitude of the detection oscillation.

When a Coriolis gyroscope is switched on for the first time or switched on again (reset), the amplitude of the excitation oscillation at the switch-on time t=0 has a value of zero and is afterwards set to a predetermined value for the excitation oscillation. Here, the time until steady state of the amplitude after excitation oscillation is reached can be more than 0.1 s, while the measurement period for determining the read-out signal may be much smaller, for example only 10 ms. In particular, during switch-on of the Coriolis gyroscope to which a high rotation rate, for example of 1000°/s, is applied, the read-out signal or the gyroscope scale factor can be determined very fast with sufficient precision. As during the switch-on time the amplitude of the excitation oscillation has not yet reached its value in steady state, the output signal output by the Coriolis gyroscope can represent a "wrong" value, which does not satisfy the required specifications of the Coriolis gyroscope.

A possibility for solving this problem is optimizing the bandwidth of the main controller of the read-out unit. A further possibility for solving the problem is to provide a sufficient force resource such that during switch-on the mass system is excited in the first oscillation mode by forces, which range considerably beyond the forces necessary under normal conditions.

The object of the invention is therefore to provide a simple method for optimizing the switch-on time of a Coriolis gyroscope that can be combined with other measures for optimizing the switch-on time and a Coriolis gyroscope suitable therefor.

This object is solved according to the present invention by a method and by a Coriolis gyroscope according to the independent claims. Advantageous embodiments are defined in the dependent claims.

The method for optimizing the switch-on time of a Coriolis gyroscope according to the present invention that has a mass system, which can be excited to an excitation oscillation of the Coriolis gyroscope parallel to a first axis, wherein a deflection of the mass system on account of a Coriolis force along a second axis, which is provided perpendicular to the first axis, can be verified by means of an output signal of the Coriolis gyroscope, comprises determining the amplitude of the excitation oscillation of the Coriolis gyroscope at a defined time, determining the output signal of the Coriolis gyroscope at the defined time and generating a normalized output signal of the Coriolis gyroscope by multiplying the determined output signal by the quotient of the amplitude of the excitation oscillation of the Coriolis gyroscope in steady state and the determined amplitude.

According to an embodiment the steps of determining the amplitude, of determining the output signal, and of generating the normalized output signal are repeated at least at a further defined time.

According to an embodiment at least one of the defined times is defined as reached by means of a timing device.

According to another embodiment the amplitude of the excitation oscillation of the Coriolis gyroscope is determined continuously. At least one of the defined times is defined as reached, when the determined amplitude of the excitation oscillation has reached a respective predetermined value.

If the amplitude of the excitation oscillation is determined continuously, then the method will be ended according to an embodiment, if the determined amplitude corresponds to the amplitude of the excitation oscillation of the Coriolis gyroscope in steady state.

According to another embodiment the method is ended, after a predetermined time has been reached.

A Coriolis gyroscope according to the present invention comprises a mass system that can be excited to an excitation oscillation of the Coriolis gyroscope parallel to a first axis, wherein a deflection of the mass system on account of a Coriolis force along a second axis, which is provided perpendicular to the first axis, can be verified using an output signal of the Coriolis gyroscope. In addition, the Coriolis gyroscope comprises a read-out device, which comprises a first detection unit, a second detection unit, and an output unit. The first detection unit is configured to determine the amplitude of the excitation oscillation of the Coriolis gyroscope at a defined time, while the second detection unit is configured to determine the output signal of the Coriolis gyroscope at the defined time. The output unit is configured to generate a normalized output signal of the Coriolis gyroscope by multiplying the determined output signal by the quotient of the amplitude of the excitation oscillation of the Coriolis gyroscope in steady state and the determined amplitude.

According to an embodiment the Coriolis gyroscope comprises further a timing device that is configured to define the defined time as reached.

According to another embodiment the Coriolis gyroscope comprises further a comparison unit that is configured to compare the determined amplitude with a predetermined value.

In what follows the invention will be explained in detail with reference to the accompanying figures according to exemplary embodiments.

FIG. 4 shows a schematic illustration of a Coriolis gyroscope as a two-part single-oscillator according to an embodiment of the invention.

FIG. 5 shows a schematic illustration of a Coriolis gyroscope as a two-part single-oscillator according to a further embodiment of the invention.

In general in a Coriolis gyroscope the proportionality factor between the Coriolis force and the rotation rate that is proportional to the amplitude of the excitation oscillation is called scale factor. Here applies:

$$F_C = 2m\dot{x}\Omega \quad (1)$$

Wherein the following equation applies for the derivative of the deflection x of the excitation oscillation:

$$\dot{x} = \frac{d}{dt}(x) = \frac{d}{dt}(A(t)\sin\omega t) = \frac{d}{dt}(A(t))\sin\omega t + A(t)\frac{d}{dt}(\sin\omega t). \quad (2)$$

Here, $F_C$ is the Coriolis force, m is the mass of the detection oscillator, x is the deflection of the excitation oscillation, $\Omega$ is the angular velocity or rotation rate (i.e. the measurement parameter), A(t) is the amplitude of the deflection of the excitation oscillation, and $\omega$ is the operation frequency of the excitation oscillation, which corresponds advantageously to the resonance frequency of the excitation oscillator.

In this process, the excitation oscillation of the Coriolis gyroscope is the oscillation to which the mass system of the Coriolis gyroscope is excited parallel to a first axis (x axis). The mass m of the detection oscillator in equation (1) is the mass of the mass system, which is excited on account of the Coriolis force along a second axis (y axis) to a detection oscillation. The mass system of the Coriolis gyroscope can be formed as a one-piece mass system or as a multipart mass system. For example, the mass system may comprise two partial masses (oscillators) that are coupled to each other via a spring system and that can perform relative movement with respect to each other. For such a multipart mass system only the mass of the partial mass is filled into equation (1) as mass m of the detection oscillator that oscillates along the second axis.

If the Coriolis gyroscope is switched-on out of a rest state at time t=0, i.e. that A(t=0) has a value of 0, after one to ten percent (1%-10%) of the setting time of the amplitude of the excitation oscillation the derivative of the amplitude A(t) with respect to time can be neglected for the following typical values: for a setting time of the amplitude A(t) of more than 0.1 s and for an operation frequency of the excitation oscillation of $\omega = 2\pi \cdot 10000$ s$^{-1}$.

Figure 1:
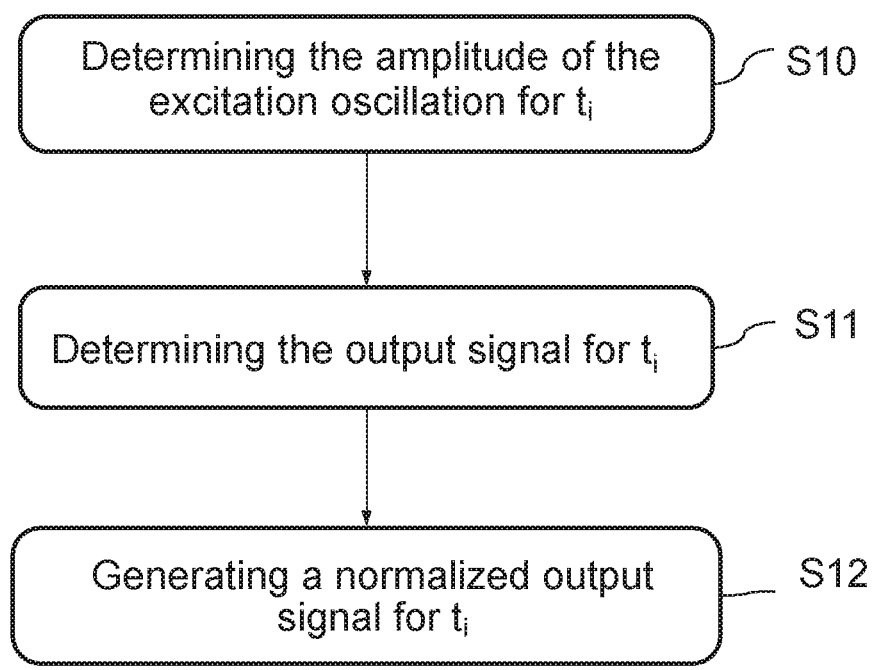
FIG. 1 illustrates schematically a first embodiment of the method for optimizing the switch-on time of a Coriolis gyroscope according to the present invention.

FIG. 1 shows schematically a first embodiment of the method for optimizing the switch-on time of a Coriolis gyroscope.

Here, at a defined time $t_i$ the amplitude $A(t_i)$ of the excitation oscillation as well as the output signal $S(t_i)$ of the Coriolis gyroscope at the defined time $t_i$ is determined (steps S10 and S11). The output signal S may be the aforementioned scale factor or the read-out signal of the Coriolis gyroscope. The output signal S of the Coriolis gyroscope may be provided in an already processed form. For example, the output signal may have been processed already by means of analogue/digital converters, demodulators, and/or other components, for example to compensate temperature influences.

In step S12 a normalized output signal $S_0(t_i)$ is generated for the defined time $t_i$, by dividing the determined output signal $S(t_i)$ by the determined amplitude $A(t_i)$ and by multiplying the result with the amplitude $A_0$ of the excitation oscillation in steady state. The amplitude $A_0$ of the excitation oscillation in steady state is known in this process from a calibration process or from a value set in a closed loop controller for the amplitude. Hence, the following formula applies for the normalized output signal $S_0(t_i)$ to be output:

$$S_0(t_i) = \frac{A_0}{A(t_i)} S(t_i). \quad (3)$$

If the output signal S of the Coriolis gyroscope is the scale factor, the normalized output signal $S_0$ will be the normalized scale factor that can be used in the following steps for calculating of other values or output signals of the Coriolis gyroscope.

By means of this normalization for a defined time $t_i$ that lies within the setting time of the excitation oscillation a valid output signal that satisfies all specifications can be generated. In principal, the method can also be carried out for defined times $t_i$, which lie outside of the setting time.

The method for optimizing the switch-on time illustrated in FIG. 1 may be carried out for only one defined time $t_i$ within the setting time of the excitation oscillation or may also be carried out for several defined times $t_i$ with i=1 to n, wherein one, several, or all of the defined times $t_i$ (i=1 ... n) may lie within the setting time of the excitation oscillation.

After the end of the setting time of the excitation oscillation the method for generating a normalized output signal may be omitted again such that a determined output signal S(t) is output by the Coriolis gyroscope. This corresponds to the normal detection process of the Coriolis gyroscope.

For determining the defined time(s) $t_i$ two possibilities may be used. On the one hand, one or several of the defined times $t_i$ may be temporally predetermined and may be determined by means of a timing device, on the other hand, one or several of the defined times may be defined as reached, if the amplitude of the excitation oscillation has reached a respective predetermined value.

Figure 2:
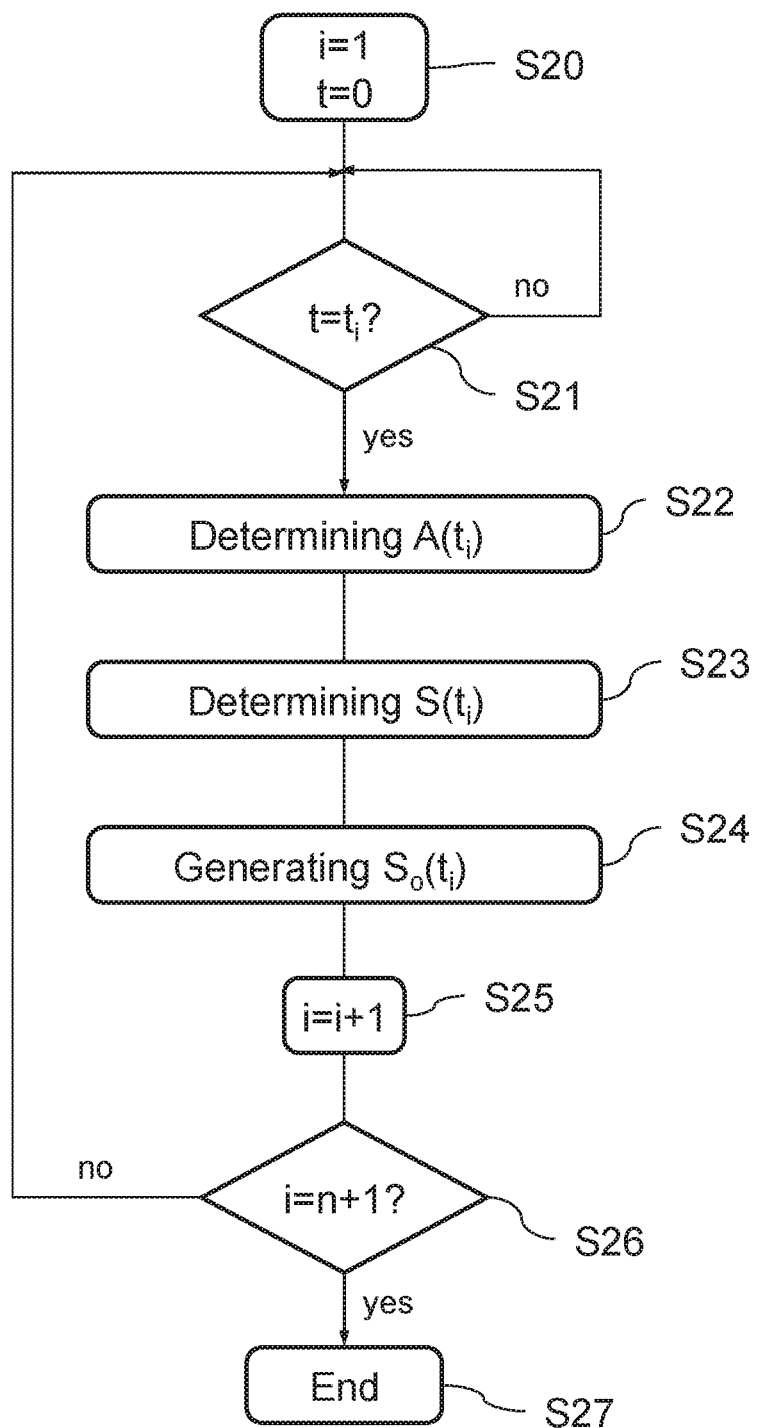
FIG. 2 shows a schematic illustration of a second embodiment of the method for optimizing the switch-on time of a Coriolis gyroscope, wherein the defined times are determined by a timing device.

FIG. 2 shows a schematic illustration of a second embodiment of the method for optimizing the switch-on time of a Coriolis gyroscope according to the present invention in which the defined times are defined as reached by means of a timing device. Here, specific time values $t_i$ with i=1 to n are predetermined and correspond to specific points in time within and, if necessary, also outside of the setting time of the excitation oscillation. For example, $t_1$ may correspond to a point in time at which the amplitude of the deflection of the excitation oscillation has reached about 10% of its value $A_0$ in steady state, which may for example amount to 10 μm. Further predetermined times $t_i$ may for example correspond to points in time at which the amplitude of the deflection of the excitation oscillation has reached about 50% or about 90% of its value $A_0$ in steady state. The last value $t_n$ may for example correspond to a point in time at which the amplitude of the deflection of the excitation oscillation has reached its value $A_0$ at steady state. In this process, the predetermined times $t_1$ to $t_n$ may be based on experience values or may be based on calculations of the transient oscillation process of the excitation oscillation. The single times $t_i$ may be distributed even or uneven across the setting time of the excitation oscillation.

As initial values for the method according to FIG. 2 the index i is set to one and the time t for switch-on of the Coriolis gyroscope is set to zero in a first step S20. By means of a timing device, the time passed since t=0, i.e. since switch-on of the Coriolis gyroscope is measured, wherein the measured time t is compared with a predetermined value for $t_i$, for example $t_1$ (step S21). When the predetermined value $t_i$ has been reached, for this time $t_i$ the amplitude $A(t_i)$ as well as the output signal $S(t_i)$ of the Coriolis gyroscope are determined (steps S22 and S23). In step S24 the normalized output signal $S_0(t_i)$ is generated and output according to equation (3) based on the determined amplitude $A(t_i)$ and the output signal $S(t_i)$. Then, i is increased by one (step S25) and in step S26 it is checked, whether i has reached the maximal value n+1. If this is the case, the method will be ended in step S27, while otherwise the steps S21 to S26 will be repeated. As timing device that measures the time for example a clock or a clock generator connected to a counter may be used.

Alternatively to measuring the time and to comparing it with a predetermined value also predetermined cycles of a clock generator, i.e. the switching event of a signal, may be used in step S21 for deciding, whether a defined time $t_i$ has been reached or not. In this case, the temporal distance between the single defined times $t_i$ are always the same.

Figure 3:
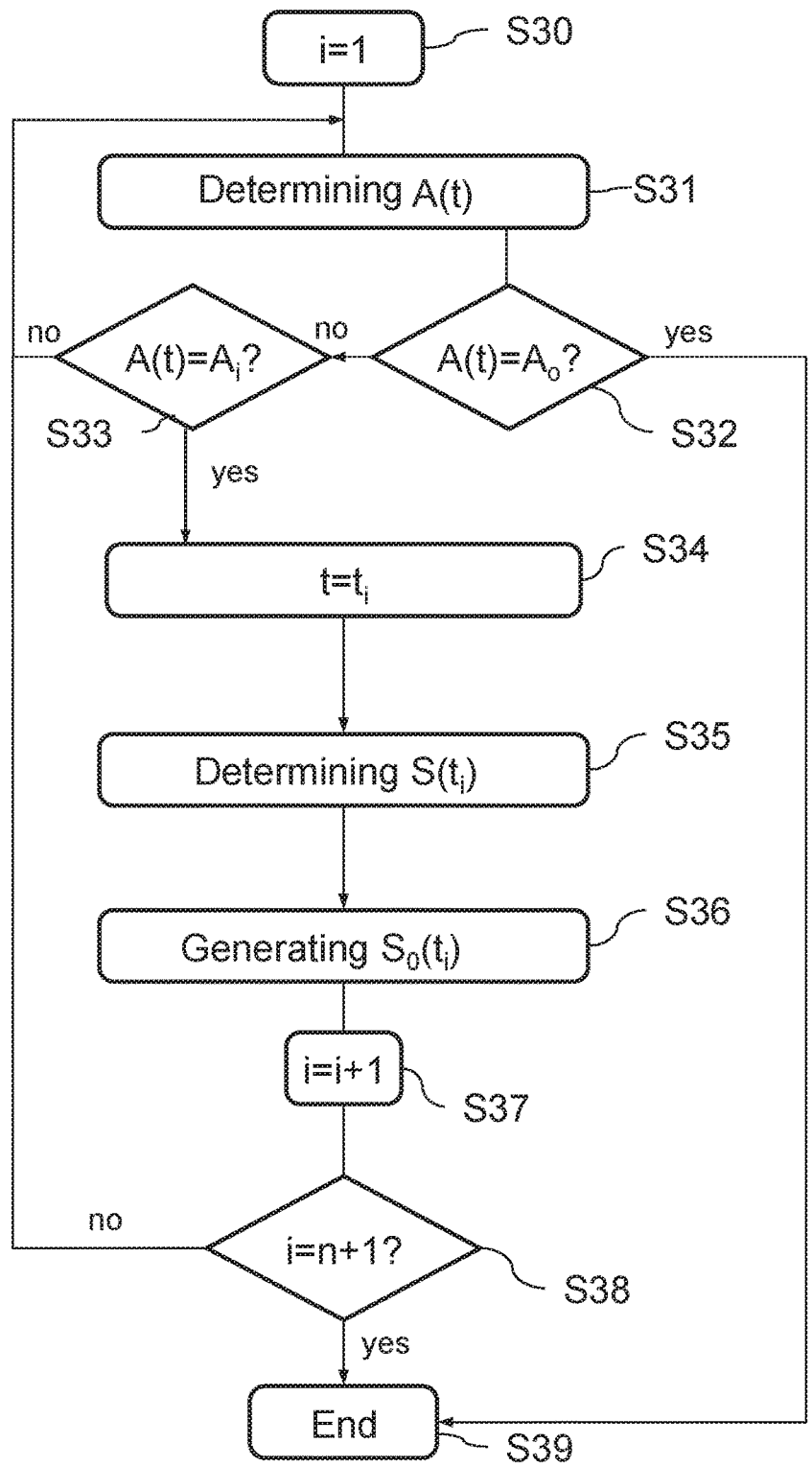
FIG. 3 shows a schematic illustration of a third embodiment of the method for optimizing the switch-on time of a Coriolis gyroscope according to the present invention, in which the defined times are determined by comparing a continuously determined amplitude with a respective predetermined value.

FIG. 3 illustrates schematically a third embodiment of the method for optimizing the switch-on time of a Coriolis gyroscope according to the present invention, wherein the defined times $t_i$ are determined via measuring the amplitude $A(t)$ of the excitation oscillation. This means that the amplitude $A(t)$ of the excitation oscillation is determined continuously and compared to predetermined values, wherein the point in time at which the amplitude $A(t)$ has reached a predetermined value $A_i$ is set as defined time $t_i$.

Similar to step S20 in FIG. 2 the index i is first set to 1 in step S30, however, without the necessity to determine or fix the time. In step S31 the amplitude $A(t)$ is determined, which is then compared to the steady state amplitude $A_0$ of the excitation oscillation (step S32). If the amplitude $A(t)$ has already reached the value $A_0$, the method will be ended directly in step S39. If the amplitude $A(t)$ of the excitation oscillation has not yet reached the value $A_0$, the amplitude will be compared in step S33 to a predetermined value $A_i$, for example to $A_1$. If the value $A_i$ has not yet been reached, the steps S31 to S33 will be repeated until the amplitude $A(t)$ reaches the value $A_i$. If the amplitude $A(t)$ has reached the predetermined value $A_i$ in step S34, the time t for which $A(t)=A_i$ will be defined as the defined time $t_i$, wherein the time t or the elapsed time does not need to be actually determined. Then, the output signal $S(t_i)$ is determined in step S35 and the normalized output signal $S_0(t_i)$ is generated in step S36 in similar manner as already described with respect to steps S23 and S24 in FIG. 2. Hereafter, the index i is increased by one in step S37 and is compared to the value n+1 in step S38. If the index i has reached the value n+1, the method will be ended in step S39. If the value n+1 has not yet been reached, steps S31 to S38 will be repeated.

Step S38 may also be omitted such that after step S37 steps S31 to S37 are repeated until it is determined in step S32 that the amplitude $A(t)$ corresponds to the amplitude $A_0$ in steady state. Alternatively, also step S32 may be omitted such that steps S31 and S33 to S37 are repeated until i=n+1 is reached, wherein, if necessary, the amplitude $A(t)$ may have already reached the value $A_0$.

Also in the method according to the second embodiment (FIG. 2) the amplitude $A(t)$ of the excitation oscillation may be measured or determined continuously, i.e. not only if a defined time $t_i$ is reached. Just as well, also the output signal $S(t)$ may be determined continuously in the second and the third embodiment of the method. Then it is possible to generated also the normalized output signal $S_0(t)$ continuously. In this process, the normalization factor $A_0/A(t)$ may for example be calculated at the defined times $t_i$ such that $S_0(t)$ is generated for times t with $t_i<t<t_{i+1}$ with the normalization factor $A_0/A(t_i)$.

In principle, the defined times should be chosen such that the distance between two consecutive times $t_i$ and $t_{i+1}$ is larger or equal to the periods for measuring the amplitude $A(t)$, the output signal $S(t)$ or the time t, wherein the longest period of measurement is decisive.

According to a further embodiment also arbitrary combinations of components of the second and the third embodiment are possible. For example, one or several of the defined times, for example the first defined time $t_1$, may be defined as reached by means of a timing device, while one or several other defined times, for example the last defined time $t_n$, are determined by means of the measured amplitude $A(t)$ and by means of comparing it with a predetermined value $A_i$.

FIG. 4 illustrates schematically a Coriolis gyroscope in a specific embodiment that is suitable for carrying out the method according to the present invention. The Coriolis gyroscope 1 comprises a mass system 100 and a read-out device 200, which is connected to the mass system via signal lines 310, 320, 330.

According to the embodiment illustrated in FIG. 4 the mass system 100 comprises a first partial mass 110, which constitutes a driving frame, and a second partial mass 120 that serves as a detection mass. However, the functions of the two partial masses may also be realized by a one-piece mass. The first partial mass 110 is anchored on a substrate via first spring elements 115 and can be excited to an oscillation along a first axis (x axis) by means of fixed excitation electrodes 130, which are fixedly connected to the substrate, and of movable excitation electrodes 135, which are fixedly connected to the first partial mass 110. To this end, an alternating voltage $U(t)$ is applied to the fixed excitation electrodes 130 (not illustrated). The second partial mass 120 is connected via second spring elements 125 to the first partial mass 110 such that it can be deflected due to a Coriolis force acting on the mass system 100 along a second axis (y axis). The second axis is perpendicular to the first axis. The deflection of the second partial mass 120 can be detected via a read-out signal by means of movable read-out electrodes 140, which are fixedly connected to the second partial mass 120, and fixed read-out electrodes 145, which are connected fixedly to the substrate.

In the embodiment illustrated in FIG. 4, the fixed excitation electrodes 130 are connected via a first signal line 310 to the read-out device 200, allowing transfer of a first signal $V_1$. The first signal $V_1$ may for example comprise an amplitude of the excitation oscillation of the first partial mass 110.

However, the first signal $V_1$ may also be a signal that allows determining the amplitude of the excitation oscillation after several processing steps. In FIG. 4 the case is illustrated that providing the excitation oscillation as well as reading out of the momentary amplitude A of the excitation oscillation is carried out via the same electrodes, i.e. via the excitation electrodes 130 and 135. Here, the fact is used that all signals can be superposed.

For reasons of clarity in FIG. 4 only read-out of the first signal $V_1$ is illustrated, but not the driving function which excites the oscillation. In addition, the first signal line 310 must not be necessarily connected to the fixed excitation electrodes 130. For example, one or several separate electrode pairs, of which a part is fixedly connected to the substrate and another part is fixedly connected to the first partial mass 110, may be used for detecting the excitation oscillation, i.e. of the momentary amplitude of the excitation oscillation, and may be connected to the signal line 310. Also an optical detection of the amplitude of the excitation oscillation is conceivable. In each case a first signal $V_1$ is obtained and transferred via the signal line 310 to the read-out device 200.

The Coriolis gyroscope 1 further comprises a second signal line 320 via which a second signal $V_2$ can be transferred to the read-out device 200. In the embodiment illustrated in FIG. 4 the second signal line 320 is fixedly connected to the fixed read-out electrodes 145. However, the second signal $V_2$ may also be obtained by means of another type of detection of the movement of the second partial mass such that the second signal line 320 needs not necessarily be connected to the fixed read-out electrode 145. The second signal $V_2$ is the read-out signal of the Coriolis gyroscope 1.

Further, the Coriolis gyroscope may comprise one or several further signal lines, for example a third signal line 330, via which for example a third signal $V_3$ between the read-out unit 200 and the mass system 100 can be transferred. For example, the third signal line 330 may be connected with a further electrode 150, which serves for example for error correction.

According to an embodiment illustrated in FIG. 5 voltages $U_1(t)$ and $U_2(t)$ are applied for driving the excitation oscillator and indirectly for detecting its mechanical oscillations. The voltages are applied between the terminals of the fixed excitation electrodes 130 and ground or between the further electrode 150 and ground. The sample mass consisting of the conductively connected excitation and read-out oscillators is kept always at virtual ground via a charge amplifier 350. The voltages $U_1$ and $U_2$ are applied to generate the signals $V_1$ and $V_3$. A voltage is applied to the respective electrodes 140, 145 within the read-out oscillator analogously to the voltages $U_1$ and $U_2$ (not illustrated) to obtain the signal $V_2$ via the charge amplifier 350.

At the output of the charge amplifier 350 an image of the voltage sum of all time variable voltages between electrodes 130, 150 and the sample mass that is weighted by time dependent capacities is generated. For separating the partial signals a demultiplexer 360 is provided. Demultiplexing may be achieved by applying a constant voltage for detection in predetermined time intervals only to predetermined electrodes and by inverting the sign of the voltage afterwards. This provides two sampling values that are subtracted from each other and represent a scaled form of the mechanical movement of the excitation and/or read-out oscillator.

According to the embodiment of FIG. 5 the signals V1, and V2, and V3 are therefore read-out signals of the changes of capacities scaled with voltages, and, hence, of the mechanical movements.

The read-out device 200 comprises a first detection unit 210, a second detection unit 220 and an output unit 230. The first detection unit 210 is configured to determine from the first signal $V_1$ the amplitude $A(t_i)$ of the excitation oscillation of the Coriolis gyroscope 1 at a defined time $t_i$. The second detection unit 220 is configured to determine from the second signal $V_2$ the output signal $S(t_i)$ at the defined time $t_i$. The output unit 230 is configured to generate a normalized output signal $S_0(t_i)$ of the Coriolis gyroscope for the defined time $t_i$ by multiplying the output signal $S(t_i)$ determined by the second detection unit 220 with the quotient of the amplitude $A_0$ of the excitation oscillation in steady state and the amplitude $A(t_i)$ determined by the first detection unit 210. This allows the read-out unit 200 of the Coriolis gyroscope 1 outputting of a normalized output signal $S_0$ that satisfies also during the switch-on phase of the Coriolis gyroscope 1 the specifications required for valid data.

However, the normalized output signal $S_0$ may also be used for further signal processing, whose end results represents then an output signal of the Coriolis gyroscope. To this end, the read-out device 200 or the Coriolis gyroscope 1 may comprise further components. For example, the read-out device 200 may comprise components for a compensation of temperature influences on the output signal of the Coriolis gyroscope.

As already described with respect to the method of the present invention the first detection unit 210 or the first detection 210 and the second detection unit 220 may be formed such that the amplitude A(t) of the excitation oscillation or the amplitude A(t) and the output signal S(t) are determined continuously. Then, the amplitude A(t) as well as the output signal S(t) can be transferred continuously to the output unit 230 and processed therein. However, it is also possible that only the values of the amplitude $A(t_i)$ and of the output signal $S(t_i)$ at the defined time $t_i$ are transferred to and processed by the output unit 230.

As described with respect to the second and third embodiment of the method according to the present invention the defined times $t_i$ may be defined as reached by means of a timing device or by reaching a predetermined value $A_i$ of the amplitude A(t). Therefore, the read-out device 200 may further comprise a timing device 240, for example a clock or a clock generator and/or a comparison unit 215.

Here, the timing device 240 defines a time t as the defined time $t_i$, if the elapsed time has reached a predetermined value or if a clock signal has been recognized. Then, the defined times $t_i$ are not dependent from a measured amplitude A(t) of the excitation oscillation. If a defined time $t_i$ is recognized or defined by the timing device 240 as reached, the timing device 240 will cause the first detection unit 210 to determine the amplitude $A(t_i)$ and will cause the second detection unit 220 to determine the output signal $S(t_i)$.

Although in the embodiments illustrated in FIGS. 4 and 5 the read-out device 200 comprises a timing device 240, a temporally defined signal for determining the amplitude $A(t_i)$ and the output signal $S(t_i)$ may also be generated by a component outside of the read-out device 200 or even outside of the Coriolis gyroscope 1 and may be transferred to the first detection unit 210 and the second detection unit 220.

The comparison unit 215 serves for comparing an amplitude A(t) of the excitation oscillation continuously determined by the first detection unit 210 with a predetermined value $A_i$. If the comparison unit 215 recognizes that a predetermined value $A_i$ has been reached, the corresponding time will be recognized or defined as defined time $t_i$ and the second detection unit 220 will be caused to determine the output signal $S(t_i)$. The value $A(t)=A(t_i)=A_i$ is further transferred to the output unit 230 and is used for generating the normalized output signal $S_O(t_i)$ as described.

In FIGS. 4 and 5 the comparison unit 215 is illustrated as component of the first detection unit 210. However, the comparison unit 215 may also be arranged outside of the first detection unit 210, outside of the read-out device 200, or even outside of the Coriolis gyroscope 1, as long as it is suitable to cause the first detection unit 210 to transfer the amplitude value $A(t_i)$ to the output unit 230 and to cause the second detection unit 220 to determine the value of the output signal $S(t_i)$ and to transfer this value to the output unit 230.

The method according to the present invention and the Coriolis gyroscope suitable therefor allows an estimation of the quality of the scale factor or of the output signal of the Coriolis gyroscope already during switch-on time of the Coriolis gyroscope. This allows estimating whether in regular operation, i.e. for a steady state excitation oscillation, the desired scale factor can be reached and whether, hence, the Coriolis gyroscope will satisfy the required specifications and will operate as desired. Accordingly, it is not necessary to wait for a worst-case time to decide, whether the output signal of the Coriolis gyroscope is sufficiently precise. This leads to a considerably reduction of the switch-on time of a Coriolis gyroscope, for example by a factor of 100. In addition, the method and the components of the Coriolis gyroscope necessary therefore can be easily implemented and can be combined with other measures for optimizing the switch-on time.

The invention claimed is:

1. A method for optimizing a switch-on time of a Coriolis gyroscope having a mass system that can be excited to an excitation oscillation of the Coriolis gyroscope parallel to a first axis (x), wherein a deflection of the mass system on account of a Coriolis force along a second axis (y), which is provided perpendicular to the first axis (x), can be verified using an output signal (S) of the Coriolis gyroscope, comprising:
    determining an amplitude (A) of the excitation oscillation of the Coriolis gyroscope at a defined time $(t_i)$,
    determining an output signal (S) of the Coriolis gyroscope at the defined time $(t_i)$, and
    generating a normalized output signal $(S_O)$ of the Coriolis gyroscope by multiplying the output signal (S) by a quotient of the amplitude $(A_O)$ of the excitation oscillation of the Coriolis gyroscope in steady state and the amplitude (A).

2. The method according to claim 1, further comprising repeating the steps for determining the amplitude (A), for determining the output signal (S), and for generating the normalized output signal $(S_O)$ for at least one further defined time $(t_{i+1})$.

3. The method according to claim 2, characterized in that
    at least one of the defined time $(t_i)$ or the at least one further defined time $(t_{i+1})$ is defined as reached by means of a timing device.

4. The method according to claim 2, characterized in that
    the amplitude (A) of the excitation oscillation of the Coriolis gyroscope is determined continuously, and
    at least one of the defined time $(t_i)$ or the at least one further defined time $(t_{i+1})$ is defined as reached, when the amplitude (A) of the excitation oscillation has reached a respectively predetermined value $(A_i, A_{i+1})$.

5. The method according to claim 4, characterized in that
    the method is ended, when the amplitude (A) corresponds to the amplitude $(A_O)$ of the excitation oscillation of the Coriolis gyroscope in steady state.

6. The method according to claim 1, characterized in that
    the method is ended after reaching a predetermined point in time $(t_n)$.

7. A Coriolis gyroscope comprising:
    a mass system that can be excited to an excitation oscillation of the Coriolis gyroscope parallel to a first axis (x), wherein a deflection of the mass system on account of a Coriolis force along a second axis (y), which is provided perpendicular to the first axis (x), can be verified using an output signal (S) of the Coriolis gyroscope, and
    a read-out device that comprises a first detection unit, a second detection unit, and an output unit, wherein
        the first detection unit is configured to determine an amplitude (A) of the excitation oscillation of the Coriolis gyroscope at a defined time $(t_i)$,
        the second detection unit is configured to determine the output signal (S) of the Coriolis gyroscope at the defined time $(t_i)$, and
        the output unit is configured to generate a normalized output signal $(S_O)$ of the Coriolis gyroscope by multiplying the output signal (S) by a quotient of the amplitude $(A_O)$ of the excitation oscillation of the Coriolis gyroscope in steady state and the determined amplitude (A).

8. The Coriolis gyroscope according to claim 7, further comprising:
    a timing device that is configured to define the defined time $(t_i)$ as reached or to initiate the determining of the amplitude (A) of the excitation oscillation and of the output signal (S) of the Coriolis gyroscope at the defined time $(t_i)$.

9. The Coriolis gyroscope according to claim 7, further comprising:
    a comparison unit that is configured to compare the determined amplitude (A) with a predetermined value.

* * * * *